June 14, 1955     A. S. BISHOP     2,710,721
ELECTRONIC DIVIDING CIRCUIT
Filed Nov. 27, 1945
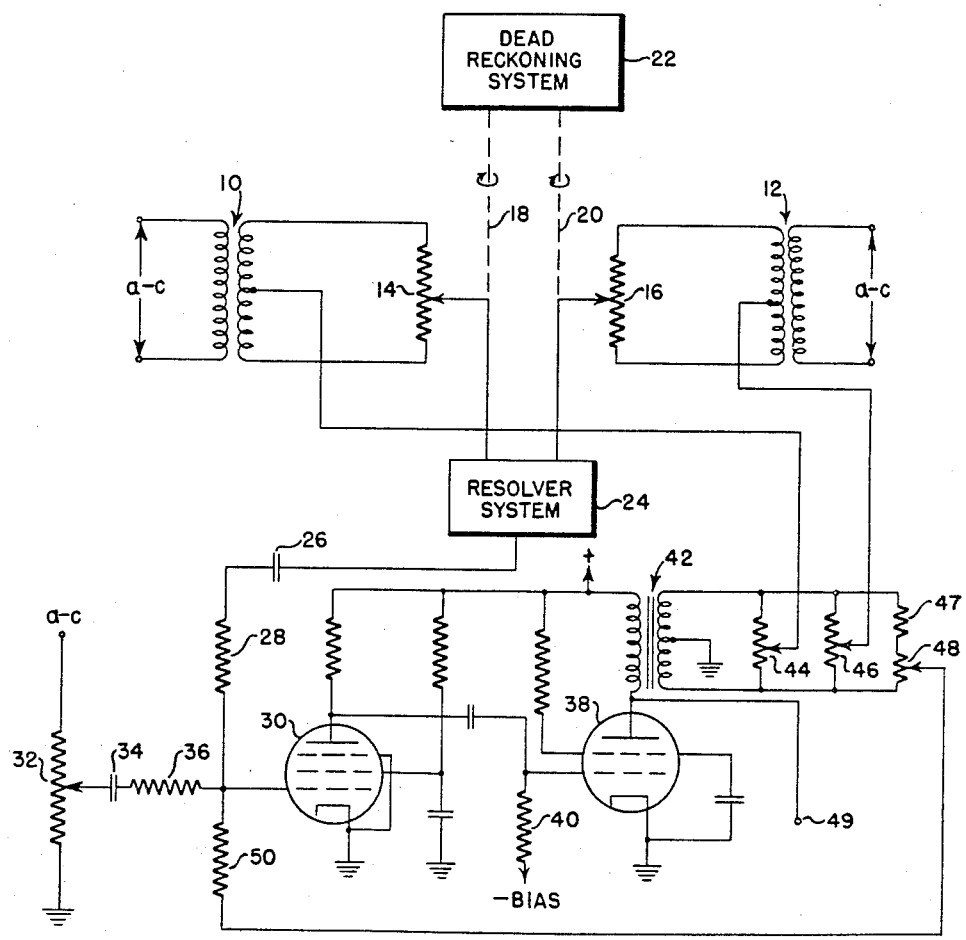
*INVENTOR.*
AMASA S. BISHOP
BY
ATTORNEY

United States Patent Office 2,710,721
Patented June 14, 1955

2,710,721

ELECTRONIC DIVIDING CIRCUIT

Amasa S. Bishop, Cambridge, Mass., assignor, by mesne assignments, to the United States of America as represented by the Secretary of the Air Force Application November 27, 1945, Serial No. 631,171

5 Claims. (Cl. 235—61.5)

This invention relates generally to electrical circuits and more particularly to an electronic dividing circuit.

It is frequently desirable to solve electronically an equation involving a quotient of two quantities. A specific example of such a case is that of a ground position indicator (G. P. I.) system, two functions of which are, first, to indicate continuously the position of an aircraft with respect to some point of known location on the ground and, second, to indicate a proper direction of aircraft heading and time of bomb release, if this point or some other known point is to be a bombing target. One such system is described in the copending application by John W. Gray and Ivan A. Greenwood, Jr., Serial No. 598,161, filed June 7, 1945.

The operation of the above system requires setting up a virtual target which is displaced from the actual target and which moves with the wind velocity, and the aircraft may follow a computed straight line course to a proper bomb release position by continuously heading toward this virtual target. After the bombs are released, they will fall in such a manner that they lag behind the aircraft due to air resistance. The total horizontal distance of this lag during the period of fall is known as trail. Among the quantities electrically computed in the system is time-till-impact, which may be defined as the time from any given instant before impact until the instant at which the bombs would strike the target, if the aircraft followed the course plotted by the system and dropped its bombs at the time indicated by the system. Time-till-impact varies according to the equation:

$$t_i = \frac{R+T}{V_a}$$

in which $t_i$ is the time-till-impact, R is the horizontal range from the aircraft to the virtual target, T is the trail, and $V_a$ is the magnitude of the air speed of the aircraft. Voltages proportional to R and T are generated by components of the system, and some means is necessary to utilize these voltages in the production of a third voltage proportional to $t_i$, provided $V_a$ is known.

It is therefore an object of the present invention to provide an electronic means for computing a quantity which is the quotient of two other quantities. It is a more specific object of the invention to provide a novel means of producing from two voltages a third voltage which is proportional to the sum of the magnitudes of the first two voltages divided by a third quantity of a given magnitude.

The invention generally contemplates utilizing an electronic amplifier to which the two given voltages are applied in such a way that they produce an input voltage proportional to their sum. Negative feedback is employed and the amplifier is so designed that the output voltage is inversely proportional to the amount of feedback.

Other objects, features and advantages of the present invention will suggest themselves to those skilled in the art and will become apparent from the following description of the invention taken in connection with the accompanying drawing which shows a portion of a system including a circuit embodying the principles of the present invention. The drawing is a simplified diagram of a part of a system of the type described in the copending application by John W. Gray and Ivan A. Greenwood, Jr., previously referred to, and which shows the incorporation of the circuit of the present invention.

The primary coils of transformers 10 and 12 are supplied by a source of alternating potential of constant amplitude. The output voltages of the secondaries of these two transformers are applied across potentiometers 14 and 16, respectively. The movable taps of these potentiometers are driven by shafts 18 and 20, respectively, which in turn are driven by a dead reckoning system 22. The latter may be any system capable of causing two shaft rotations the rates of which are proportional respectively to the rectangular components of the velocity of the aircraft relative to the ground. A system of this type is described in the copending application by John W. Gray, et al., Serial No. 598,160, filed June 7, 1945.

The voltages at the variable taps of potentiometers 14 and 16 are applied to a resolver system 24, which in turn produces a single voltage which is applied through a capacitor 26 and a resistor 28 to the control grid of a pentode 30. Resolver system 24 may be any system capable of converting voltages proportional to given rectangular coordinates into a voltage proportional to the vector sum of the given rectangular coordinates. An example of such a system is described in the copending application by John W. Gray and Duncan MacRae, Jr., Serial No. 598,162, filed June 7, 1945.

An alternating potential of constant amplitude is applied across a potentiometer 32, the voltage at the variable tap of which is applied through a capacitor 34 and a resistor 36 to the control grid of pentode 30. The plate and the screen grid of pentode 30 are supplied by a source of positive potential, and the output of the pentode is applied to the control grid of a tetrode 38, which is also connected through a resistor 40 to a source of bias potential. The plate and screen voltages of tetrode 38 are supplied by the same source as are those of pentode 30, and the output voltage of tetrode 38 is developed across the primary of a transformer 42 in the plate circuit, the secondary of the transformer being center-tapped to ground. The two ends of the secondary coil of transformer 42 are connected to potentiometers 44 and 46, the variable taps of which are connected to the center-taps of the secondaries of transformers 10 and 12 respectively. Resistor 47 and potentiometer 48 are connected in series, and the combination is connected in parallel with potentiometers 44 and 46. The variable tap of potentiometer 48 is connected through a resistor 50 to the control grid of pentode 30. The output voltage of tetrode 38 is available at a terminal 49 and may be utilized as needed in other portions of the system.

To describe a typical operation of the system of Fig. 1, it may first be assumed that the variable taps of potentiometers 44 and 46 are at the mid-points of these potentiometers, which places them at ground potential because of the center tap to ground connection on the secondary of transformer 42. This in turn places the center taps of transformers 10 and 12 at ground potential, so that as a result two alternating voltages of equal magnitude with respect to ground potential and of opposite phase are produced at the end terminals of each secondary. Thus the variable taps of potentiometers 14 and 16 may be set so as to apply voltages to resolver system 24 which are of either phase and of any amplitude up to the maximum. If this maximum amplitude is made proportional to the maximum horizontal or ground range to be represented, then the input voltages to the resolver may be made respectively proportional to the horizontal rectangular coordinates of any ground point with respect to the aircraft. The phases of these voltages may be chosen so as to indicate the direction in which coordinate is measured along the coordinate axis, taking the aircraft as the point of origin. If desired the coordinate axes may be taken in east-west and north-south directions.

The positions of the variable taps of potentiometers 14 and 16 are set to correspond to the coordinates of an actual target at a time when the relative positions of the aircraft and the target are known. The rates of rotation of shafts 18 and 20 are made respectively proportional, as explained above, to the rectangular components of the ground velocity of the aircraft. As a result the voltages applied to resolver system 24 remain continuously proportional to the coordinates of the target as the aircraft moves.

If now the position of the virtual target rather than that of the actual target is to be indicated, the output voltages produced by potentiometers 14 and 16 must be modified. For a full explanation of the manner in which this may be accomplished, reference may be had to the copending application by John W. Gray and Duncan MacRae, Jr., mentioned above. It may merely be stated here that the variable taps of potentiometers 44 and 46 are displaced from their center positions by amounts corresponding respectively to the rectangular components of wind velocity. The voltages thereby applied to the center taps of the secondaries of transformers 10 and 12 are sufficient to modify the input voltages to resolver system 24 so that they become proportional to the coordinates of the virtual target.

The alternating voltage applied from resolver system 24 to the control grid of pentode 30 becomes proportional to R, the horizontal or ground range to the virtual target, due to the operation described above. To produce a second input voltage to pentode 30 which is proportional in magnitude to T, the trail, the variable tap of potentiometer 32 is adjusted in accordance with a predetermined calibration involving altitude, air speed, and bomb type. The output of pentode 30 is further amplified by tetrode 38, and the output of the latter is converted into two push-pull voltages of equal magnitude by the center tap arrangement of transformer 42. The voltages produced at the variable taps of potentiometers 44 and 46, may thus be made of either phase and of any magnitude up to the maximum amplifier output. The relative magnitudes and positions of resistor 47 and potentiometer 48 are made such that the voltage fed back to pentode 30 is always of such polarity as to cause negative feedback.

It may be shown that the magnitude of the voltage on the control grid of pentode 30 is proportional to the sum of the three voltages applied to it through resistors 28, 36, and 50, assuming these resistors are equal. The input voltage to the amplifier exclusive of the feedback voltage is also proportional to the sum of the two voltages applied through resistors 28 and 36 under the same conditions. The output of an amplifier employing negative feedback is expressed by the equation:

$$E_o = \frac{E_i A}{1 + \beta A}$$

where $E_o$ is the output voltage, $E_i$ is the input voltage, $A$ is the gain of the amplifier with no feedback, and $\beta$ is the fraction of the total output voltages which is fed back. Since $E_i$ is proportional to $R+T$, and since $A$ is quite large in comparison with unity, $E_o$ is approximately proportional to $$\frac{R+T}{\beta}$$

By moving the variable tap of potentiometer 48 from its center position by an amount proportional to the air speed, $V_a$, $\beta$ is made proportional to $V_a$, and hence $E_o$ is proportional to $$\frac{R+T}{V_a}$$

or $t_i$, the time-till-impact. This voltage may be applied through output terminal 48 to other portions of the system in which it is used.

It will be obvious that while the invention has been described in connection with a cooperating system, it could readily be used in other applications requiring an output voltage proportional to the quotient of two known quantities. The above system has been described merely as one example of such a use.

While there has been described what is at present considered to be the preferred embodiment of this invention, it will be obvious to those skilled in the art that various changes and modifications may be made therein without departing from the scope of the invention.

The invention claimed is:

1. In a bombing system for an aircraft, a computer for deriving a voltage proportional to the time-till-impact of a bomb dropped on a target from known parameters proportional to the horizontal range to the target, the wind velocity, the trail of the bomb, and the speed of the aircraft, said computer comprising a high-gain electron tube amplifier; first and second means for obtaining a fraction of the output voltage of said amplifier in proportion to first and second rectangular coordinates, respectively, of the wind velocity, with respect to a given direction; means for continuously deriving first and second rectangular coordinates, with respect to said given direction, of the horizontal range to the target; third and fourth means coupled respectively to said first and second means and to said range-rectangular-coordinate deriving means for obtaining first and second voltages proportional respectively to the sums of the first and second rectangular coordinates of the wind velocity and the horizontal range; means for deriving a third voltage equal to the vector sum of said first and second voltages; means for deriving a fourth voltage proportional to the trail of the bomb; means for applying said third and fourth voltages to the input of said amplifier to produce an input voltage equal to the sum thereof; and means for negatively feeding back to the input of said amplifier a portion of the amplifier output voltage which is proportional to the speed of said aircraft; whereby the output voltage of said amplifier is proportional to the time-till-impact.

2. In a bombing system for an aircraft, a computer for deriving a voltage with respect to a point of reference potential which is proportional to the time-till-impact of a bomb dropped on a target from known parameters proportional to the horizontal range of the target, the wind velocity, the trail of the bomb, and the speed of the aircraft, said computer comprising a high gain electron-tube amplifier, an output transformer having a primary winding connected as a load to the output of said amplifier and having a secondary winding which has its midpoint connected to said point of reference potential; first, second, and third impedances connected in parallel across the secondary winding of said output transformer; adjustable tapping means for each of said first and second impedances to select portions of the secondary voltage of said output transformer with respect to said point of reference potential which are proportional respectively to first and second rectangular coordinates of the wind velocity with respect to a given direction; first and second voltage transformers having primary windings connected to a source of alternating voltage and secondary windings connected respectively to said tapping means of said first and second impedances; fourth and fifth impedances connected respectively across the secondary windings of said first and second voltage transformers; means for tapping said fourth and fifth impedances to obtain first and second voltages, with respect to said point of reference potential, which are respectively proportional to the first and second rectangular coordinates of the horizontal range to the target relative to the potential of the respective midpoints of said first and second voltage transformers, means for deriving a third voltage equal to the vector sum of said first and second voltages, means for deriving a fourth voltage proportional to the trail of the bomb, means for applying said third and fourth voltages to the input of said amplifier to produce an input voltage equal to the sum thereof, adjustable means for tapping said third impedance to select a portion of the secondary voltage of said output transformer with respect to said point of reference potential, which is proportional to the speed of said aircraft, and means for negatively feeding back to the input of said amplifier the voltage across the tapped portion of said third impedance.

3. A computer comprising an amplifier having a single ended output and a balanced output, a resolver converting voltages proportional to given first rectangular cordinates into an output voltage proportional to the vector sum of said rectangular coordinates, means conducting said output voltage to the input of said amplifier, a pair of windings having a reference source of alternating voltage applied thereacross, a potentiometer connected across each said winding, the variable contact of each said potentiometer being moved proportionate to one of said given first rectangular coordinates and being connected to the input of said resolver, a second pair of potentiometers connected across the balanced output of said amplifier, the variable contact of each of said second pair of potentiometers being connected to the center tap of one of said pair of windings.

4. A computer comprising an amplifier having a single ended output and a balanced output, a resolver converting voltages proportional to given first rectangular coordinates into an output voltage proportional to the vector sum of said rectangular cordinates, means conducting said output voltage to the input of said amplifier, a pair of windings having a reference source of alternating voltage applied thereacross, a potentiometer connected across each said winding, the variable contact of each said potentiometer being moved proportionate to one of said given first rectangular coordinates and being connected to the input of said resolver, a second pair of potentiometers connected across the balanced output of said amplifier, the variable contact of each of said second pair of potentiometers being connected to the variable tap of the first said pair of windings whereby adjustment of said second pair of potentiometers modifies the voltages proportional to said given first rectangular coordinates in proportion to a given pair of second rectangular coordinates.

5. A bombing computer comprising in combination a dead reckoning system having a pair of output shafts rotated at rates proportional to rectangular components of the velocity of an aircraft relative to ground, a reference source of alternating potential applied across a first pair of potentiometers, the variable tap of each potentiometer being driven by one of said output shafts, a resolver to the input of which the variable tap of each said potentiometer is connected, the output potential of said resolver being proportional to the vector sum of said rectangular components, said output potential being connected to the input of an amplifier which has a single ended resultant output and a balanced output circuit, means to apply also to the input of said amplifier a potential proportional to the trail of a given bomb, a second pair of potentiometers connected across said balanced output circuit, the variable tap of each of said second pair of potentiometers being conductively connected to one of said first pair of potentiometers whereby movement of said last named tap proportional to a rectangular component of wing velocity modifies the potential at the variable tap of said one of said first pair of potentiometers accordingly, and adjustable feed back means feeding a part of the output from said amplifier to the input thereof proportional to the airspeed of said aircraft.

References Cited in the file of this patent

UNITED STATES PATENTS

| 2,255,679 | Riddle | Sept. 9, 1941 |
| 2,342,822 | Rumpel | Feb. 29, 1944 |
| 2,374,071 | Barton | Apr. 17, 1945 |
| 2,401,779 | Swartzell | June 11, 1946 |
| 2,414,819 | Lakatos | Jan. 28, 1947 |
| 2,435,195 | Bomberger | Feb. 3, 1948 |
| 2,438,112 | Darlington | Mar. 23, 1948 |
| 2,492,351 | Bode | Dec. 27, 1949 |
| 2,493,183 | Boghosian | Jan. 3, 1950 |

FOREIGN PATENTS

| 511,175 | Great Britain | of 1937 |